Dec. 11, 1934.  G. L. WEST  1,983,720

ORNAMENTAL GLASS AND METHOD OF MAKING THE SAME

Filed Jan. 26, 1934

POLISHED SURFACE

BLACK GLASS

INVENTOR

Patented Dec. 11, 1934

1,983,720

UNITED STATES PATENT OFFICE 1,983,720

ORNAMENTAL GLASS AND METHOD OF MAKING THE SAME

George L. West, Pittsburgh, Pa., assignor to Pittsburgh Plate Glass Company, a corporation of Pennsylvania Application January 26, 1934, Serial No. 708,527

4 Claims. (Cl. 41—30)

Figure 1:
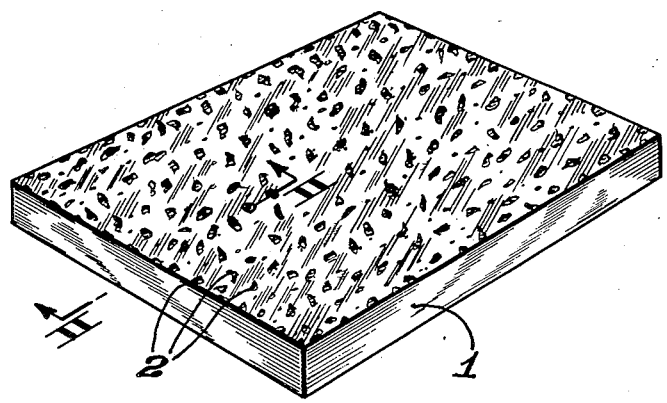
Figure 2:
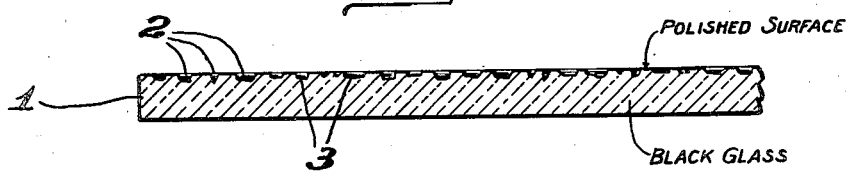

The invention relates to ornamental opaque glass, such as is used for store fronts, paneling, lavatories, table tops, and the like, as a substitute for marble or granite. Such glass is made in various colors, such as white, black and jade, and the present invention may be used with these or other glass colors, but has its primary use in connection with black glass, with which the ornamentation shows to better advantage than with other colors. The invention has for its principal objects the provision of a product which has an improved appearance, and the provision of a method of treatment whereby the desired ornamentation is secured at a low cost both in the matter of labor and materials. A plate ornamented in accordance with the invention is illustrated in the accompanying drawing, wherein:

Figure 1 is a plan view. And Fig. 2 is a section on the line II—II of Fig. 1. In these figures, the size of the recesses formed in the polished face of the plate is much exaggerated for the purpose of illustration.

Referring to the drawing, 1 is a sheet of opaque glass, such as black carrara having its upper face polished, and 2 are pits or recesses in which is coloring material 3, such as paint or enamel. The pits are formed by an operation similar to sand blasting, except that the material used with the air blast is much coarser and is so applied that the areas of the sheet face surrounding the pits remain polished. The apparatus used is a regular sand blasting device, and the abrading material is either steel shot (preferably about No. 20) or crushed flint gravel (preferably about No. 14). The pits formed are smaller, more irregular in shape, and vary more in size than those illustrated, and when the ornamentation in completed by the addition of the coloring material, the surface closely approximates in appearance that of polished black granite. When black glass is used, the coloring material ordinarily employed is either white or dark green.

The coloring material is applied after the blasting step by coating the entire face of the plate with paint, waterspar enamel or other coating having good weathering properties. After the coating is either partially or wholly dried, the face of the plate is subjected to a buffing or rubbing operation which removes all of the material lying over the polished surface of the plate. Some of the coloring material is also removed from the pits (as indicated in Fig. 2), but enough remains to give such pits the desired color. This portion of the coloring material adheres tenaciously to the surfaces of the pits because such surfaces are relatively rough due to the fact that they are produced by a blasting operation.

Many color combinations are possible, depending on the color of the glass and the character of the coloring material. In some cases, the operations produce surfaces resembling various kinds of granite, as heretofore pointed out, and in other cases, the appearance is different from that of any other material with which I am familiar.

What I claim is:

1. A plate of opaque glass having its face polished and having pits of irregular shape irregularly distributed thereover, and coloring material in said pits of a color contrasting to that of the glass.

2. A plate of opaque glass having its face polished and having pits of irregular shape spalled out of the glass and irregularly distributed over its face, and coloring material in said pits of a color contrasting to that of the glass.

3. A process of ornamenting a plate of opaque glass having a polished face, which consists in directing over such face a blast of fluid under pressure carrying abrading particles of hard material in such manner as to form irregular pits in said face surrounded by areas of polished glass, applying a coat of coloring material over said face, and then rubbing said face to remove the coloring material lying over the polished portion thereof.

4. A process of ornamenting a plate of opaque glass having a polished face, which consists in directing over such face a blast of fluid under pressure carrying abrading particles of hard material in such manner as to form irregular pits in said face surrounded by areas of polished glass, applying a coat of coloring material over said face, permitting said coat to dry, and then rubbing said face to remove the coloring material lying over the polished portion thereof.

GEORGE L. WEST.